(12) United States Patent
Uehara et al.

(10) Patent No.: US 8,002,342 B2
(45) Date of Patent: Aug. 23, 2011

(54) BLIND COVER POSITIONING STRUCTURE

(75) Inventors: Tatsuaki Uehara, Sakura (JP); Yuya Takahashi, Sakura (JP)

(73) Assignee: Yachiyo Industry Co., Ltd., Sayama-shi (JP)

( * ) Notice: Subject to any disclaimer, the term of this patent is extended or adjusted under 35 U.S.C. 154(b) by 0 days.

(21) Appl. No.: 12/899,103

(22) Filed: Oct. 6, 2010

(65) Prior Publication Data
US 2011/0080022 A1    Apr. 7, 2011

(30) Foreign Application Priority Data
Oct. 7, 2009   (JP) ................................. 2009-233688

(51) Int. Cl.
*B60J 7/00* (2006.01)
(52) U.S. Cl. .................... 296/216.08; 296/214; 296/217
(58) Field of Classification Search ......... 296/216.06–216.08, 214, 217
See application file for complete search history.

(56) References Cited

U.S. PATENT DOCUMENTS

| 4,923,244 | A  | * | 5/1990  | Clenet ........................... 296/214 |
| 4,966,409 | A  | * | 10/1990 | Schmidhuber et al. ....... 296/213 |
| 5,005,899 | A  | * | 4/1991  | Clenet ........................... 296/214 |
| 7,121,618 | B2 | * | 10/2006 | Uehara et al. ................ 296/217 |
| 7,850,230 | B2 | * | 12/2010 | Faerber ........................ 296/217 |
| 7,946,648 | B2 | * | 5/2011  | Farber et al. ................. 296/217 |

FOREIGN PATENT DOCUMENTS
JP    2002-178766    6/2002
* cited by examiner

*Primary Examiner* — Dennis Pedder
(74) *Attorney, Agent, or Firm* — Rankin, Hill & Clark LLP

(57) ABSTRACT

A positioning structure for a blind cover which is arranged between a guide rail and an outer roof panel of a vehicle in a sunshade device for the vehicle, the blind cover including: a plate shaped shielding portion which is arranged between the guide rail and the outer roof panel and a supporting portion which is inserted into an installation groove formed in the guide rail, wherein the supporting portion includes a engagement portion which is flexible in a groove width direction of the installation groove, and the engagement portion is fit into an engaged portion which is an opening formed in the installation groove to position the blind cover with respect to the guide rail.

12 Claims, 5 Drawing Sheets

BLIND COVER POSITIONING STRUCTURE

CROSS REFERENCE TO RELATED APPLICATION

The application claims the foreign priority benefit under Title 35, United States Code, §119(a)-(d) of Japanese Patent Application No. 2009-233688, filed on Oct. 7, 2009, the contents of which are hereby incorporated by reference.

BACKGROUND OF THE INVENTION

1. Field of the Invention

The present invention relates to a positioning structure for a blind cover of a sunshade device.

2. Description of the Related Arts

As a sunshade device which shields an inner opening of the roof of a vehicle, there has been known a sunshade device which slidingly opens/closes an opening/closing body such as a roll screen or a sunshade panel along guide rails provided on the left and right edges of an inner opening of the roof. In such a sunshade device, a blind cover is arranged between guide rails and the outer roof panel so as to prevent devices around the roof disposed inside the vehicle body from being exposed to the vehicle interior (see Japanese Unexamined Patent Application Publication No. 2002-178766, for example).

In the blind cover described above, the lower edge and the upper edge of the blind cover are pinched by a plurality of clips provided on the guide rails and the outer roof panel, respectively, so that the blind cover is supported by the guide rails and the outer roof panel. However, this configuration has a problem that the installation work of the blind cover is complicated and the number of parts of the sunshade device is large.

SUMMARY OF THE INVENTION

In view of the above problem, an object of the present invention is to provide a blind cover positioning structure by which the above described problems are solved and a blind cover can be easily positioned with respect to a guide rail and the number of the parts of the sunshade device can be reduced.

A first aspect of the present invention provides a positioning structure for a blind cover which is arranged between a guide rail and an outer roof panel of a vehicle in a sunshade device which slidingly opens/closes an opening/closing body along the guide rail provided on an edge of an inner opening of a roof of the vehicle, the blind cover including a plate shaped shielding portion which is arranged between the guide rail and the outer roof panel and a supporting portion which is inserted into an installation groove formed in the guide rail, wherein the supporting portion includes an engagement portion which is flexible in a groove width direction of the installation groove, and the engagement portion is positioned by entering into an engaged portion which is an opening formed in the installation groove.

In the aforementioned sunshade device, the supporting portion is slidable in the installation groove with the engagement portion being deflected and contracted in a groove width direction of the installation groove, and the engagement portion is positioned in the engaged portion when the engagement portion is restored into the engaged portion which is an opening formed in the installation groove in the groove width direction of the installation groove from a deflected status.

In the sunshade device, the supporting portion is slidable in the installation groove, and the engagement portion is positioned in the engaged portion by being pressed into the engaged portion which is an opening formed in the installation groove by an auxiliary member provided in the supporting portion.

In the aforementioned positioning structure for the blind cover, both side edges of the engagement portion are preferably in contact with inner side edges of the engaged portion.

In the aforementioned positioning structure for the blind cover, the supporting portion includes a first supporting portion and a second supporting portion which is flexible in a groove width direction of the installation groove, wherein the first supporting portion and the second supporting portion are arranged in parallel in the groove width direction of the installation groove, and wherein the engagement portion is formed in a part of the second supporting portion by forming a cut in the second supporting portion.

DESCRIPTION OF THE PREFERRED EMBODIMENTS

Embodiments of the present invention are now described in detail referring to the accompanying drawings as appropriate.

Figure 1:
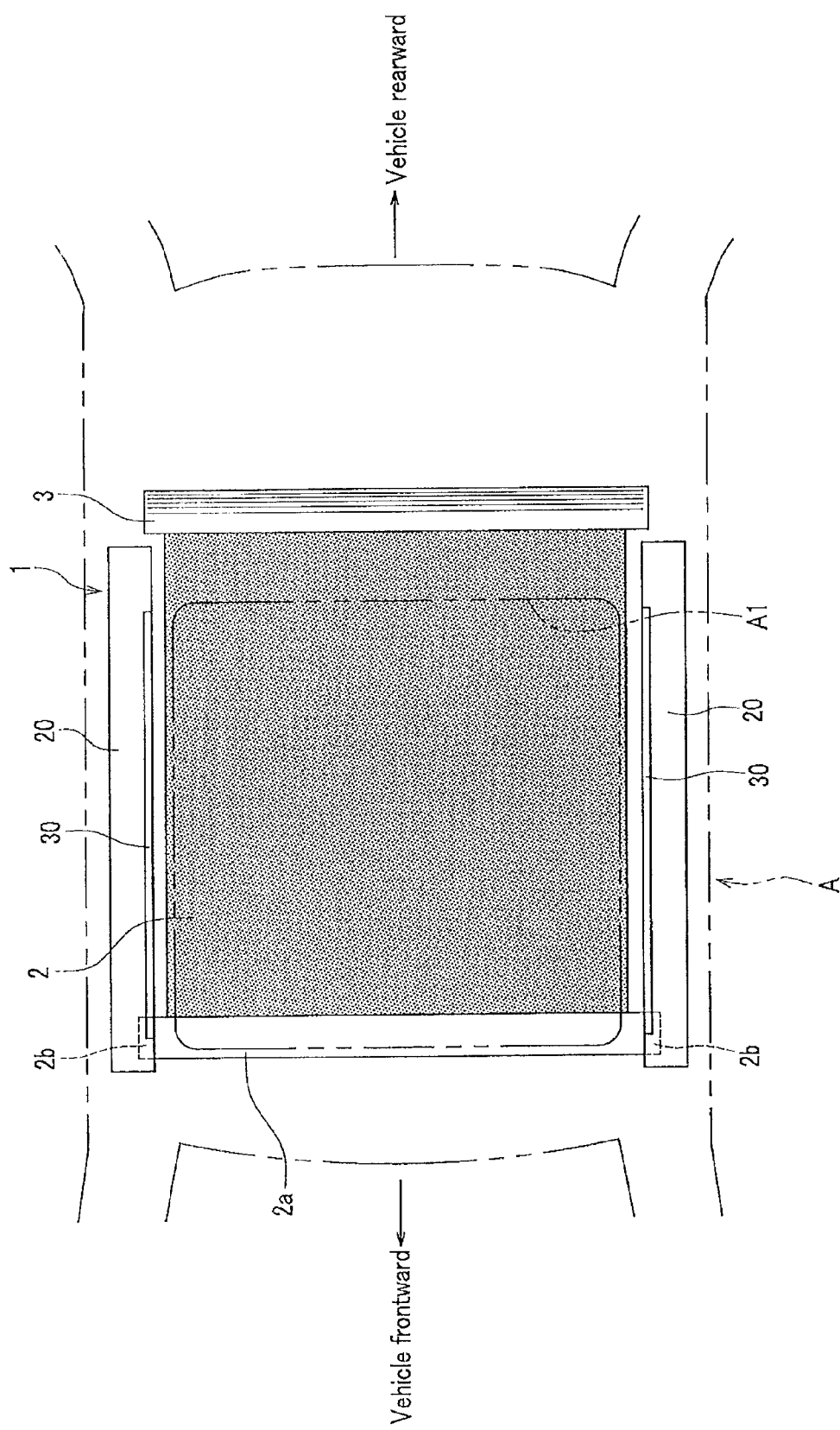
FIG. 1 is a plain view of a sunshade device according to an embodiment of the present invention.

A sunshade device 1 to which a blind cover positioning structure according to the present embodiment is applied is a device for taking in or shutting off the sun light from an outer opening (not shown) and an inner opening A1 formed on the roof of a vehicle A as shown in FIG. 1. The sunshade device 1 can be freely opened/closed by sliding in the front-rear direction a screen 2 (also referred to as an "opening/closing body") disposed above the inner opening A1 of the roof. A glass plate is fit into the outer opening of the roof, for example, so that the sun light can be taken in through the outer opening.

It is to be appreciated that the "front-rear direction" in the following description corresponds to the traveling direction of the vehicle A.

The sunshade device 1 includes guide rails 20, 20 which are provided to the left and right side edges of the inner opening A1 of the vehicle A respectively, the screen 2 which shields the inner opening A1 and a roller 3 which is disposed rear of the inner opening A1. A stay 2a is attached to the front edge of the screen 2. Sliders 2b, 2b provided to the left and right edges of the stay 2a are slidably inserted into rail grooves 21, 21 (refer to FIG. 3A) which are formed in the left and right guide rails 20, 20. The rear edge of the screen 2 is fixed to the outer peripheral surface of the roller 3.

In the sunshade device 1, the screen 2 is slid along the left and right guide rails 20, 20 in the front and rear direction by reeling out the screen 2 from the roller 3 or winding the screen 2 in the roller 3.

The left and right guide rails 20, 20 are members disposed between the ceiling inside the vehicle and an outer roof panel of the vehicle A along the left and right side edges of the inner opening A1. Since the left and right guide rails 20, 20 are formed symmetrical with each other, the guide rail 20 on the right side of the vehicle A is described in the following description, and the explanation of the guide rail 20 on the left side of the vehicle A is omitted.

Figure 2:
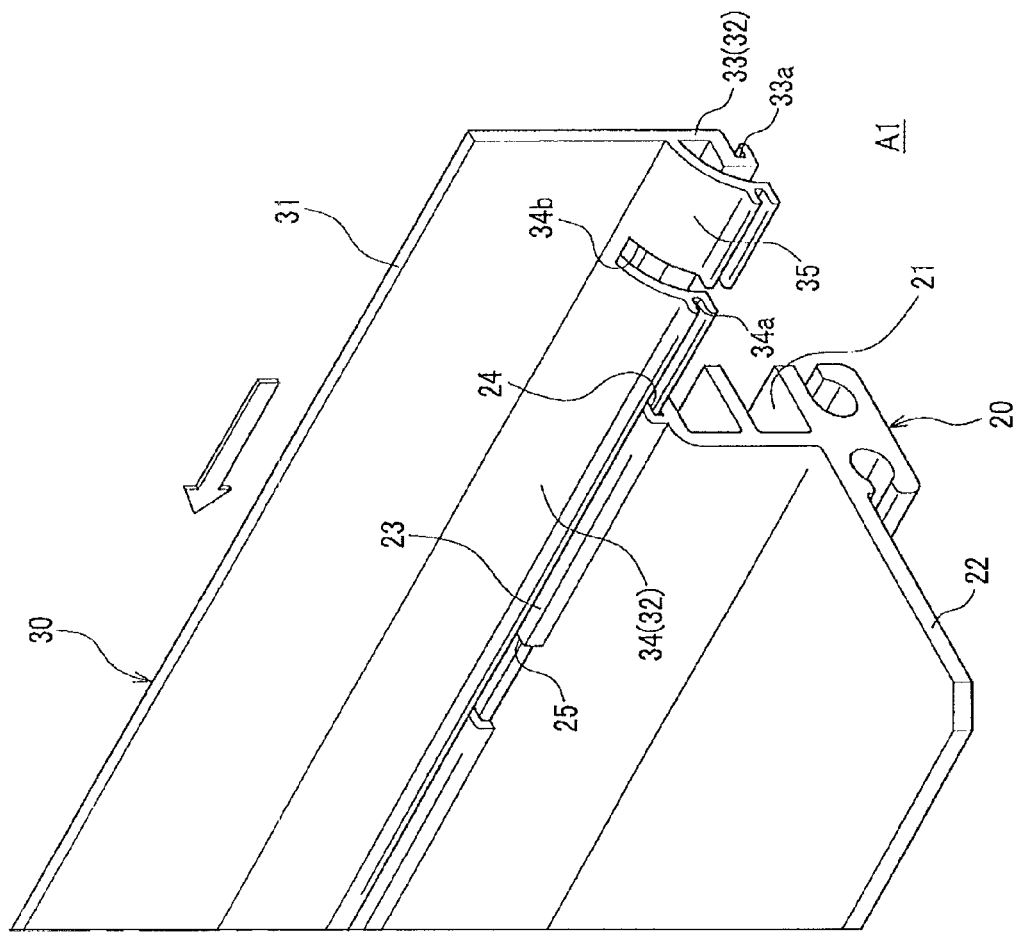
FIG. 2 is a perspective view showing a positioning structure of the embodiment.
Figure 3A:
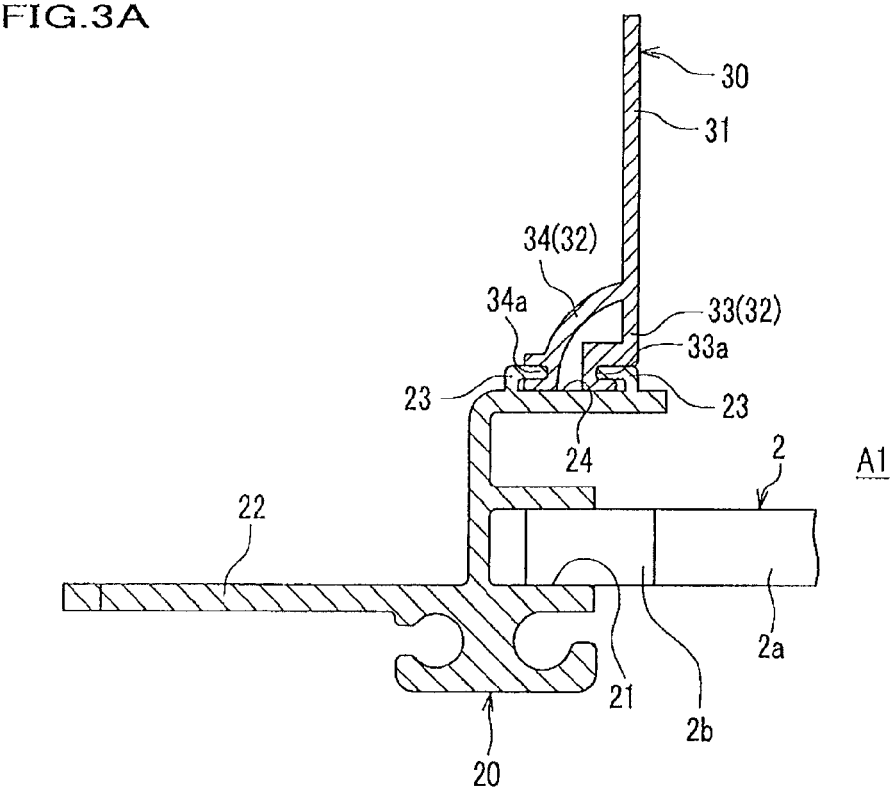
FIG. 3A is a front cross sectional view of the positioning structure of the embodiment.

The guide rail 20 is a long member which extends in the front and rear direction and has a constant cross-sectional shape as shown in FIG. 2, and is formed, for example, of an extrusion-molded shape member of aluminum alloy. As shown in FIG. 3A, a rail groove 21 which opens toward the inner opening A1 is formed on the inner opening A1 side (right side in FIG. 3A) of the guide rail 20. The rail groove 21 extends horizontally and straight in the front and rear direction and has a rectangular cross sectional space. The slider 2b of the stay 2a of the screen 2 is slidably inserted in the rail groove 21, and the slider 2b slides in the front and rear direction, guided by the rail groove 21. A flange portion 22 fixed to the upper surface of the ceiling inside the vehicle is formed on the vehicle outer side (the left side in FIG. 3A) of the guide rail 20.

A pair of left and right groove-side wall portions 23, 23 is erected vertically on the upper side of the guide rail 20. The left and right groove-side wall portions 23, 23 extend in the front and rear direction, and an installation groove 24 extending in the front and rear direction is formed between the left and right groove-side wall portions 23, 23. Each of the upper ends of the left and right groove-side wall portions 23, 23 is bent horizontally toward inner side of the installation groove 24. Therefore, the installation groove 24 has a convex shaped cross sectional space.

In the sunshade device 1 according to the present embodiment, a blind cover 30 is arranged between the guide rail 20 and the outer roof panel (not shown) as shown in FIG. 3A so as to prevent devices around the roof disposed inside of the vehicle body from being exposed to the vehicle interior.

As shown in FIG. 2 the blind cover 30 is a resin or metallic member including a flat-plate shaped shielding portion 31 which is arranged vertically and a supporting portion 32 formed at the lower edge of the shielding portion 31. This blind cover 30 extends in the front and rear direction with the side surfaces of the shielding portion 31 facing right and left direction (vehicle width direction). By inserting the supporting portion 32 into the installation groove 24 of the guide rail 20, the blind cover is supported by the upper surface of the guide rail 20.

As shown in FIG. 3A the supporting portion 32 includes a first supporting portion 33 formed at the lower edge of the shielding portion 31 and a second supporting portion 34 which protrudes in a groove width direction of the installation groove 24 from a shielding portion 31.

Formed on the vehicle inner side (right side in FIG. 3A) surface of the lower end of the first supporting portion 33 is a supporting groove 33a in which the groove-side wall portion 23 on the vehicle inner side (right side in FIG. 3A) provided on the upper surface of the guide rail 20 is entered when the supporting portion 32 is inserted into the installation groove 24.

The second supporting portion 34 is a plate shape member which protrudes toward the vehicle outer side (left side in FIG. 3A) from the shielding portion 31 above the first supporting portion 33 and extends in the front and rear direction along the first supporting portion 33 (see FIG. 2). The second supporting portion 34 curves downward from the side of the first supporting portion 33 in a projecting shape in the vehicle outer direction. The lower edge of the second supporting portion 34 and the lower edge of the first supporting portion 33 are arranged in parallel in the width direction of the installation groove 24 (the left and right direction in FIG. 3A).

Formed on the vehicle outer side (the left side in FIG. 3A) of the lower end of the second supporting portion 34 is a supporting groove 34a with which the groove-side wall portion 23 on the vehicle outer side (the left side in FIG. 3A) provided on the upper surface of the guide rail 20 is entered when the supporting portion 32 is inserted into the installation groove 24.

The second supporting portion 34 is flexible in the groove width direction of the installation groove 24. More specifically, the lower edge of the second supporting portion 34 can be elastically deformed in a direction toward the first supporting portion 33, and the supporting portion 32 can be contracted in the width direction of the installation groove 24 by deflecting the second supporting portion 34.

When the blind cover 30 is attached to the upper surface of the guide rail 20, the supporting portion 32 is inserted into the installation groove 24 with the second supporting portion 34 of the supporting portion 32 of the blind cover 30 being deflected and the supporting portion 32 being contracted in the groove width direction of the installation groove 24. The supporting portion 32 is then slid in the installation groove 24 so that the blind cover 30 can be arranged in a predetermined position of the guide rail 20.

The positioning structure of the blind cover 30 is described below.

Figure 4:
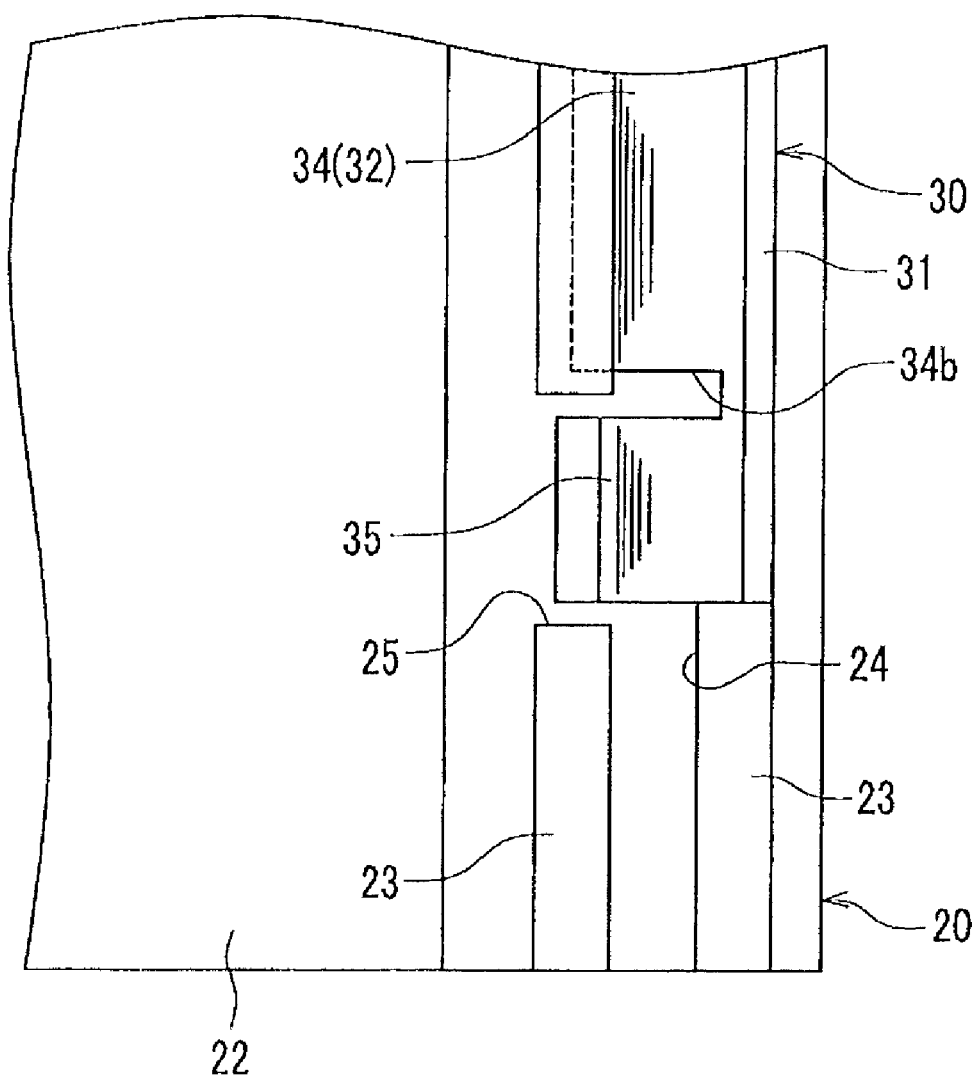
FIG. 4 is a plain view showing the positioning structure of the embodiment.

A positioning structure for fixing the blind cover 30 in a predetermined position of the guide rail 20 is, as shown in FIG. 4, configured such that an engagement portion 35 formed on the blind cover 30 is entered in an engaged portion 25 opened to the installation groove 24 of the guide rail 20 whereby the blind cover 30 is positioned in a predetermined position of the guide rail 20.

As shown in FIG. 2, the engaged portion 25 which is formed in the guide rail 20 is an opening formed by cutting off a part of the groove-side wall portion 23 on the vehicle outer side (left side in FIG. 3A). The length of the engaged portion 25 in the front and rear direction is formed to be slightly larger than that of the engagement portion 35 formed in the blind cover 30 (see FIG. 4) in the front and rear direction.

The engagement portion 35 which is formed on the blind cover 30 is formed at an end of the second supporting portion 34 by forming a cut 34b in the second supporting portion 34 of the supporting portion 32. As described above, the engagement portion 35 is a part of the second supporting portion 34 and is flexible in the groove width direction of the installation groove 24, similarly to the second supporting portion 34. When the supporting portion 32 is inserted in the installation groove 24 of the guide rail 20, the engagement portion 35 is deflected in a direction toward the first supporting portion 33 and the supporting portion 32 is contracted in the groove width direction of the installation groove 24.

In the structure for positioning the blind cover 30, as shown in FIG. 2, the supporting portion 32 of the blind cover 30 can be inserted into the installation groove 24 of the guide rail 20 and the blind cover 30 can be moved along the installation groove 24 in the longitudinal direction of the guide rail 20 with the engagement portion 35 of the blind cover 30 being deflected.

Figure 3B:
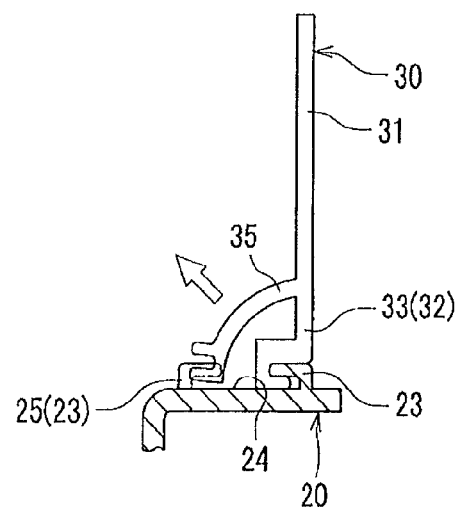
FIG. 3B is a cross sectional view showing an embodiment where an engagement portion is restored.

At this time, the engagement portion 35 slides in the installation groove 24 with the engagement portion 35 being contracted in the width direction of the installation groove 24. When the engagement portion 35 reaches the engaged portion 25 formed in the installation groove 24, as shown in FIG. 3B, the engagement portion 35 is restored in the engaged portion 25 in a direction away from the first supporting portion 33, whereby the engagement portion 35 is fit into the engaged portion 25. Thus, as shown in FIG. 4, the blind cover 30 is positioned with respect to the guide rail 20.

It is to be noted that the status where the engagement portion 35 is fit into the engaged portion 25 and the position of the blind cover 30 is determined includes a status where a side edge of the engagement portion 35 is in contact with the engaged portion 25, a status where the both side edges of the engagement portion 35 are in contact with the engaged portion 25 and a status where minute gaps exist between side edges of the engagement portion 35 and the inner side edges of the engaged portion 25.

Preferably, both side edges of the engagement portion 35 are in contact with inner side edges of the engaged portion 25. In this configuration, it is possible to prevent the blind cover from being displaced in the extending direction of the installation groove, which allows to accurately position the blind cover with respect to the guide rail.

In accordance with the positioning structure of the blind cover 30, the engagement portion 35 of the blind cover 30 is positioned when the blind cover 30 is moved along the installation groove 24 of the guide rail 20 and the engagement portion 35 of the blind cover 30 is entered in the engaged portion 25 of the guide rail 20 as shown in FIG. 4, whereby the blind cover 30 is positioned with respect to the guide rail 20. Thus, the blind cover 30 can be positioned easily and accurately, which makes the installation work of the blind cover 30 easier.

As shown in FIG. 2, the engagement portion 35 which fits in the engaged portion 25 of the guide rail 20 is formed as a part of the second supporting portion 34 by forming the cut 34b in the second supporting portion 34 of the supporting portion 32 of the blind cover 30. Therefore, the engagement portion 35 can be formed easily and the number of the parts of the sunshade device 1 (see FIG. 1) can be reduced.

Figure 5A:
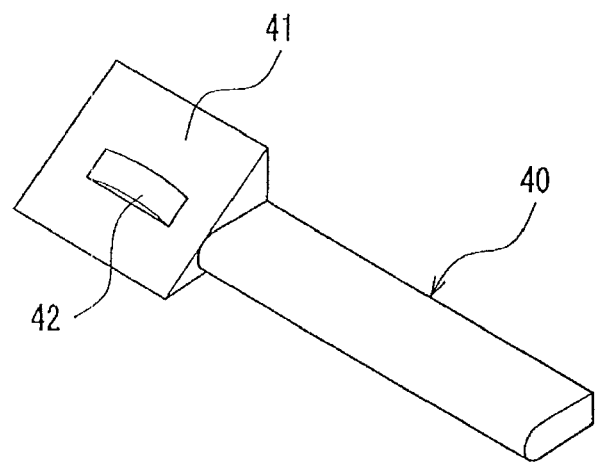
FIG. 5A is a perspective view showing an auxiliary member in a positioning structure of another embodiment.
Figure 5B:
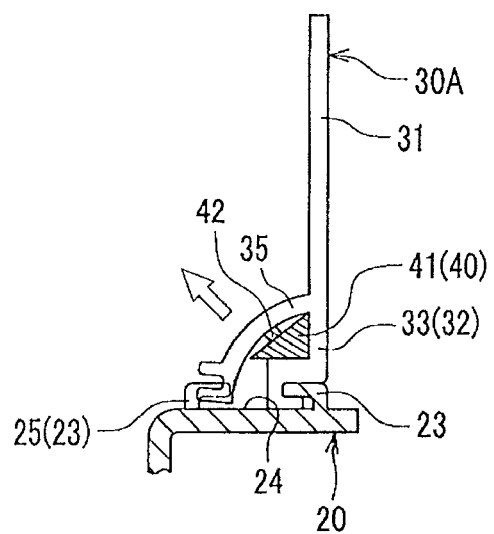
FIG. 5B is a cross sectional view showing an embodiment where an engagement portion is pressed outward.

Although the embodiment of the present invention has been described as above, the present invention is not limited to the above described embodiment and may be modified appropriately without deviating from the sprit of the invention. For example, as shown in FIG. 5B, the engagement portion 35 may be pressed into the engaged portion 25 by an auxiliary member 40. The auxiliary member 40 is a rod-shaped member which is inserted between the first supporting portion 33 of the supporting portion 32 and the engagement portion 35. As shown in FIG. 5A, an arch shaped protrusion 42 which is in contact with the inner surface of the engagement portion 35 is formed at a distal end 41 of the auxiliary member 40. As shown in FIG. 5B, a cross sectional shape of the distal end 41 of the auxiliary member 40 is formed such that the distal end 41 of the auxiliary member 40 disposed between the first supporting portion 33 and the engagement portion 35 (i.e. in the supporting portion 32) presses the engagement portion 35 into the engaged portion 25.

In this configuration, the supporting portion 32 is inserted into the installation groove 24 and the blind cover 30A is moved along the installation groove 24 with the distal end 41 of the auxiliary member 40 shown in FIG. 5B being inserted between the first supporting portion 33 and the engagement portion 35. At this time, the distal end 41 of the auxiliary member 40 is slightly compressed between the first supporting portion 33 and the engagement portion 35. When the engagement portion 35 reaches the engaged portion 25, the engagement portion 35 is pressed in the engaged portion 25 in a direction away from the first supporting portion 33 by the distal end 41 of the auxiliary member 40, and the engagement portion 35 is entered in the engaged portion 25. The distal end 41 of the auxiliary member 40 may be inserted between the first supporting portion 33 and the engagement portion 35 after the engagement portion 35 reaches the engaged portion 25.

When the engagement portion 35 is entered into the engaged portion 25 as described above, the blind cover 30A is positioned with respect to the guide rail 20. Thus, the position of the blind cover 30A can be determined easily and accurately, which makes the installation work of the blind cover 30A easier.

Although the shape of the distal end 41 of the auxiliary member 40 is not limited, by providing the arch shaped protrusion 42 as shown in FIG. 5A, it is possible to easily insert the distal end 41 between the first supporting portion 33 and the engagement portion 35.

In the present embodiment, the engagement portion 35 is formed in a part of the supporting portion 32 by forming the cut 34b in the second supporting portion 34 of the supporting portion 32 of the blind cover 30 as shown in FIG. 2, and the cross sectional shapes of the second supporting portion 34 and the engagement portion 35 are the same, however, the shape of the engagement portion 35 is not limited and the cross sectional shape of the engagement portion 35 may be different from that of the second supporting portion 34.

In the present embodiment, the blind cover positioning structure of the present invention is applied to the rolling screen type sunshade device 1 shown in FIG. 1; however, the configuration of the sunshade device to which the blind cover positioning structure of the present invention is applied is not limited. For example, the blind cover positioning structure according to the present invention may be applied to a type of sunshade device in which a plurality of sunshade panels (opening/closing body) arranged in the front and rear direction is slid in the front and rear direction along guide rails and is stored between the ceiling inside the vehicle and the outer roof panel with each of the sunshade panels being overlapped with one another.

What is claimed is:

1. A positioning structure for a blind cover which is arranged between a guide rail and an outer roof panel of a vehicle in a sunshade device which slidingly opens/closes an opening/closing body along the guide rail provided on an edge of an inner opening of a roof of the vehicle, the blind cover comprising:
   a plate shaped shielding portion which is arranged between the guide rail and the outer roof panel and
   a supporting portion which is inserted into an installation groove formed in the guide rail, wherein
   the supporting portion includes an engagement portion which is flexible in a groove width direction of the installation groove, and
   the engagement portion is positioned by entering into an engaged portion which is an opening formed in the installation groove.

2. The positioning structure for the blind cover according to claim 1, wherein the supporting portion is slidable in the installation groove with the engagement portion being deflected and contracted in the groove width direction of the installation groove, and wherein
   the engagement portion is positioned in the engaged portion by being restored in the groove width direction of the installation groove from a deflected status in the engaged portion which is the opening formed in the installation groove.

3. The positioning structure for the blind cover according to claim 1, wherein the supporting portion is slidable in the installation groove, and the engagement portion is positioned in the engaged portion by being pressed into the engaged portion which is the opening formed in the installation groove by an auxiliary member provided in the supporting portion.

4. The positioning structure for the blind cover according to claim 1, wherein both side edges of the engagement portion are in contact with inner edges of the engaged portion.

5. The positioning structure for the blind cover according to claim 2, wherein both side edges of the engagement portion are in contact with inner edges of the engaged portion.

6. The positioning structure for the blind cover according to claim 3, wherein both side edges of the engagement portion are in contact with inner edges of the engaged portion.

7. The positioning structure for the blind cover according to claim 1, wherein the supporting portion includes a first supporting portion and a second supporting portion which is flexible in the groove width direction of the installation groove, wherein the first supporting portion and the second supporting portion are arranged in parallel in the groove width direction of the installation groove, and wherein the engagement portion is formed in a part of the second supporting portion by forming a cut in the second supporting portion.

8. The positioning structure for the blind cover according to claim 2, wherein the supporting portion includes a first supporting portion and a second supporting portion which is flexible in the groove width direction of the installation groove, wherein the first supporting portion and the second supporting portion are arranged in parallel in the groove width direction of the installation groove, and wherein the engagement portion is formed in a part of the second supporting portion by forming a cut in the second supporting portion.

9. The positioning structure for the blind cover according to claim 3, wherein the supporting portion includes a first supporting portion and a second supporting portion which is flexible in the groove width direction of the installation groove, wherein the first supporting portion and the second supporting portion are arranged in parallel in the groove width direction of the installation groove, and wherein the engagement portion is formed in a part of the second supporting portion by forming a cut in the second supporting portion.

10. The positioning structure for the blind cover according to claim 4, wherein the supporting portion includes a first supporting portion and a second supporting portion which is flexible in the groove width direction of the installation groove, wherein the first supporting portion and the second supporting portion are arranged in parallel in the groove width direction of the installation groove, and wherein the engagement portion is formed in a part of the second supporting portion by forming a cut in the second supporting portion.

11. The positioning structure for the blind cover according to claim 5, wherein the supporting portion includes a first supporting portion and a second supporting portion which is flexible in the groove width direction of the installation groove, wherein the first supporting portion and the second supporting portion are arranged in parallel in the groove width direction of the installation groove, and wherein the engagement portion is formed in a part of the second supporting portion by forming a cut in the second supporting portion.

12. The positioning structure for the blind cover according to claim 6, wherein the supporting portion includes a first supporting portion and a second supporting portion which is flexible in a groove width direction of the installation groove, wherein the first supporting portion and the second supporting portion are arranged in parallel in the groove width direction of the installation groove, and wherein the engagement portion is formed in a part of the second supporting portion by forming a cut in the second supporting portion.

* * * * *